United States Patent
Shaw et al.

[11] Patent Number: 5,877,895
[45] Date of Patent: Mar. 2, 1999

[54] MULTICOLOR INTERFERENCE COATING

[75] Inventors: David G. Shaw; Daniel S. Cline; Eric P. Dawson; Marc Langlois, all of Tucson, Ariz.

[73] Assignee: Catalina Coatings, Inc., Tucson, Ariz.

[21] Appl. No.: 406,566

[22] Filed: Mar. 20, 1995

[51] Int. Cl.[6] .............................. G02B 5/28; G02B 1/00; B32B 15/08
[52] U.S. Cl. .................. 359/588; 359/585; 359/586; 359/589; 428/463
[58] Field of Search .................. 359/584, 585, 359/586, 588; 428/463

[56] References Cited

U.S. PATENT DOCUMENTS

| | | | |
|---|---|---|---|
| 3,711,176 | 1/1973 | Alfrey, Jr. et al. | 350/1 |
| 4,490,774 | 12/1984 | Olson et al. | 361/311 |
| 4,499,520 | 2/1985 | Cichanowski | 361/311 |
| 4,513,349 | 4/1985 | Olson et al. | 361/311 |
| 4,515,931 | 5/1985 | Olson et al. | 526/323 |
| 4,533,710 | 8/1985 | Olson et al. | 526/323 |
| 4,584,628 | 4/1986 | Cichanowski | 361/309 |
| 4,586,111 | 4/1986 | Cichanowski | 361/323 |
| 4,613,518 | 9/1986 | Ham et al. | 427/38 |
| 4,618,911 | 10/1986 | Cichanowski et al. | 361/308 |
| 4,647,818 | 3/1987 | Ham | 315/111 |
| 4,682,565 | 7/1987 | Carrico | 118/719 |
| 4,722,515 | 2/1988 | Ham | 261/142 |
| 4,954,371 | 9/1990 | Yializis | 427/44 |
| 5,018,048 | 5/1991 | Shaw et al. | 361/323 |
| 5,339,198 | 8/1994 | Wheatly et al. | 359/359 |

FOREIGN PATENT DOCUMENTS 0098088  1/1984  European Pat. Off. .

OTHER PUBLICATIONS

Dobrowolski F.C. et al., "Research on thin film anti–counterfeiting coatings at the National Research Council of Canada," Applied Optics, vol. 28, No. 14, Jul. 15, 1989, pp. 2702–2717, Chpts. I–IV, VI, VII.

Optical Interference Coatings For Inhibiting Of Counterfeiting, Optica Acta, 1973, vol. 20, No. 12, 925–937.

Primary Examiner—Tae Yoon
Attorney, Agent, or Firm—Christie, Parker & Hale, LLP

[57] ABSTRACT

Several techniques may be used for forming a colored interference filter coating on a substrate such as polyester film. The interference filter has two metal reflective films, at least one of which is semi-transparent. A layer of transparent acrylate polymer dielectric between the metal layers completes the interference filter, which may be sandwiched between protective layers. The dielectric is formed by evaporating an acrylate monomer having a molecular weight in the range of from 150 to 600. Preferably the acrylate monomer has a molecular weight to acrylate group ratio in the range of from 150 to 400. The acrylate condenses on the substrate and is polymerized in situ for forming a monolithic film with a sufficient thickness to produce an interference color. In several embodiments different areas of the film have different thicknesses for producing different interference colors. The thickness of the dielectric can be controlled by the amount of monomer condensed, by either controlling the temperature of the condensation surface or controlling the amount of monomer evaporated adjacent a predetermined area of the substrate. Thickness may also be controlled by condensing a uniform layer of monomer and polymerizing the monomer to different degrees for varying the shrinkage of the film and hence the thickness of the film and color.

10 Claims, 6 Drawing Sheets

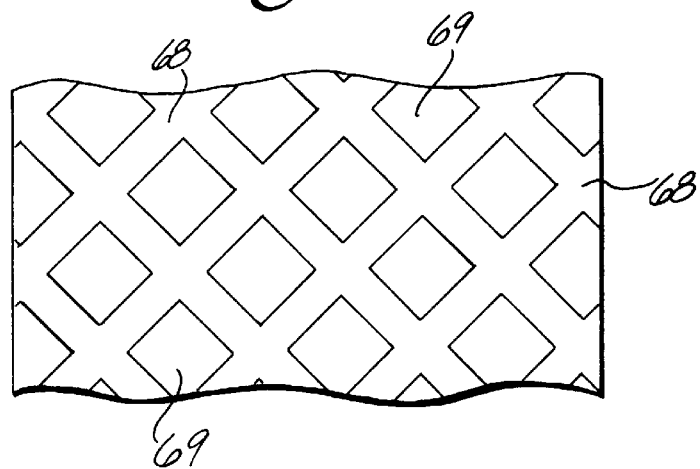
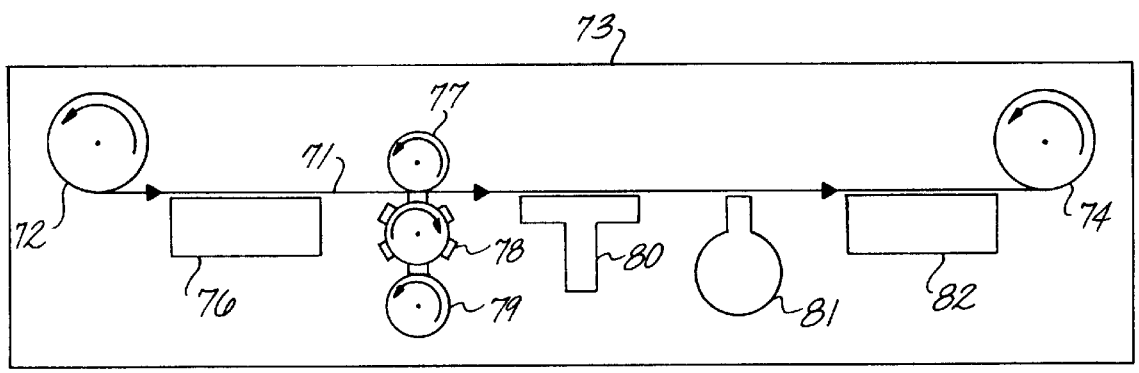

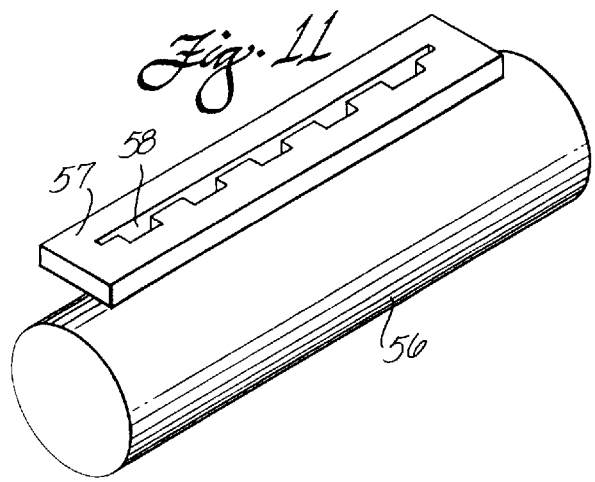
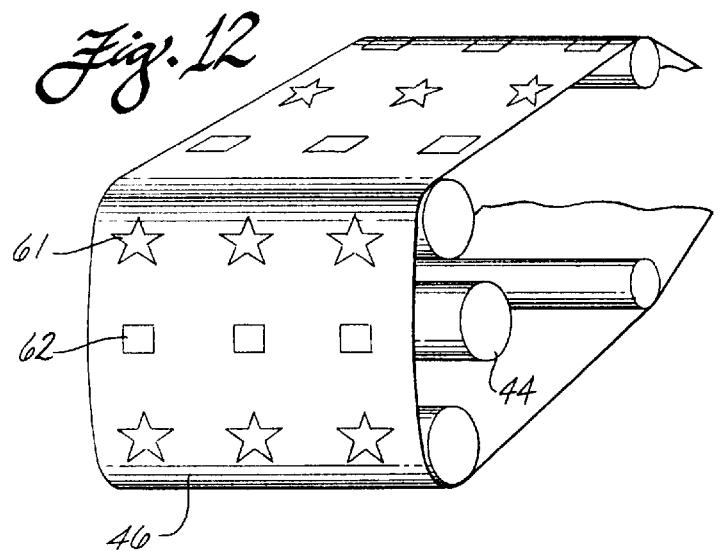
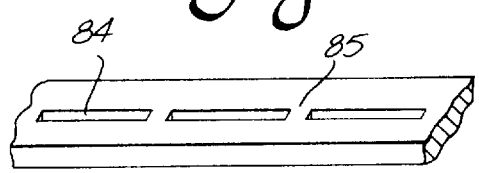
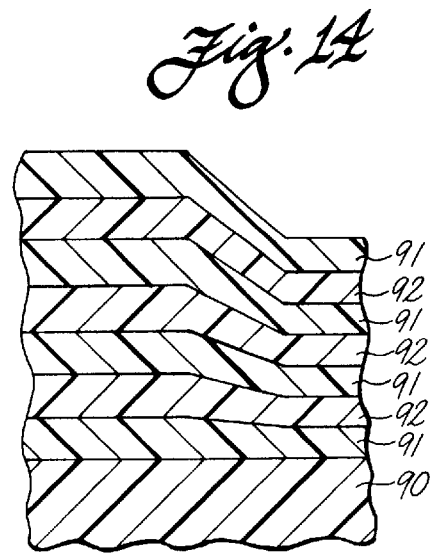

MULTICOLOR INTERFERENCE COATING

BACKGROUND

This invention relates to formation of a multicolor interference coating for a transparent or opaque substrate. The coating material is an acrylate polymer and different colors are obtained by having different thicknesses of transparent coating in adjacent areas.

Interest has developed in recent years in the protection of currency and other documents from counterfeiting by use of interference filters. The color variations available from interference filters cannot be duplicated by copying machines. The specialized equipment needed for producing the interference filters is not readily available to counterfeiters. Thus, it has been proposed to mark Canadian currency with multicolored interference filter patterns to inhibit counterfeiting. See, for example, "Optical Interference Coatings for Inhibiting Counterfeiting" by J. A. Dobrowolski, et al., Optica Acta, 1973, 20, No. 12, pp. 925–937 and U.S. Pat. No. 5,009,486 by Dobrowolski, et al.

Interference filters have been known for decades, as seen, for example, in U.S. Pat. No. 2,590,906 by Tripp. A typical interference filter has a largely reflective metal film on a smooth substrate. The reflective film is overlain by a thin layer of transparent dielectric material. The filter is completed by a semi-reflective metal layer over the dielectric. A transparent protective coating may be applied over the reflective coating, but does not form part of the interference filter itself.

When an incident light beam encounters the front semi-reflective coating of the interference filter, one fraction of the light is reflected and the other fraction passes through the semi-reflective layer into the dielectric. The transmitted portion of the beam is then reflected by the back reflective layer and retransmitted through the dielectric. A fraction of the reflected wave passes through the semi-reflective front layer where it may constructively or destructively interfere with the reflected light.

The thickness of the dielectric material is a small multiple of a quarter wavelength of light for constructive interference (allowing for the index of refraction of the dielectric material). Thus, when light is reflected from the interference filter, light with the appropriate wavelength has the reflected and transmitted beams in phase for constructive interference. Light of other colors has at least partial destructive interference. Thus, when a reflective interference filter is observed in white light, it reflects a strong characteristic color.

The interference filter has a desirable characteristic as an anti-counterfeiting measure. The color reflected from the filter depends on the path length of light passing through the dielectric material. When the filter is observed with light at normal incidence, a certain color, for example blue, is seen. When the angle of incidence and reflection from the interference filter is more acute, the total path length through the dielectric material is longer than for normal incidence. Thus, when the interference filter is observed at an angle nearer grazing incidence, a longer wavelength color, for example purple, is observed. Such a characteristic change of color, depending on the angle of viewing the interference filter, cannot be reproduced by copying machines.

A similar effect for transmission of a light can be obtained when the interference filter has a thin dielectric sandwiched between two partially reflective layers. One type of interference filter is sometimes referred to as a quarter-wave plate because of its characteristic thickness of ¼ wavelength.

To make it even more difficult for counterfeiters, it has been proposed to use interference filter layers having different thicknesses in different areas. Since the color of light reflected from an interference filter is a function of the thickness of the dielectric material, one can thereby achieve a multicolor effect by having different areas of the filter with different thicknesses.

The Dobrowolski concept is to produce an interference filter using an inorganic optical coating material, such as those listed in U.S. Pat. No. 5,009,486. A layer of such material is deposited with a certain thickness. A mask is superimposed and a second layer of that material is deposited over a portion of the first layer. Collectively, these two layers define areas of differing thicknesses and hence, different interference colors.

Such a technique is costly. The metal and dielectric layers are typically deposited on a thin film polyester substrate by a sputtering technique at a rate of about 3 to 10 meters per minute movement of the film past the deposition stations. Much faster deposition is desirable. Furthermore, two separate deposition steps with intervening masking of the surface must be performed to provide the two layers of dielectric which collectively provide a color difference.

It would be desirable to enhance the rate of formation of an interference filter by at least an order of magnitude as compared with the inorganic dielectric materials previously used. It is also highly desirable to provide varying thickness of the dielectric material in the interference filter in a single deposition step for forming a monolithic layer of differing thickness. It is also desirable to deposit the interference filter material in predetermined patterns of differing color.

BRIEF SUMMARY OF THE INVENTION

There is, therefore, provided in practice of this invention according to a presently preferred embodiment, a multicolor interference filter having a monolithic acrylate polymer film deposited on a substrate with sufficient thickness to produce interference color. A predetermined area of the acrylate film has a thickness different from a second area of the film adjacent to the predetermined area. Thus, the predetermined area has a different color from the adjacent area.

An interference color coating is made by evaporating an acrylate monomer having a molecular weight in the range of from 150 to 600 and condensing the acrylate monomer on a substrate as a monomer film. To promote adhesion, it is preferred that the acrylate monomer have a molecular weight to acrylate group ratio in the range of from 150 to 400. The acrylate is polymerized for forming a film having a thickness sufficient for producing an interference color. At least partially reflective coatings are provided on both faces of the polymer film. One of the coatings may be substantially completely reflective.

A number of different techniques may be used for forming a predetermined area of the film with a different thickness than the adjacent area. For example, controlling the temperature of the substrate to be different in different areas controls the efficiency of deposition and, hence, thickness of the deposited film. The film shrinks as it polymerizes and one may vary the degree of polymerization in different areas to achieve different shrinkage and, hence, thickness. Polymerization of the film may be induced by electron beam or ultraviolet radiation and the degree of polymerization is controlled by the total exposure to such radiation. Simply depositing the film with different thicknesses in adjacent areas is convenient for forming multicolored stripes, for example.

BRIEF DESCRIPTION OF THE DRAWINGS

These and other features and advantages of the present invention will be appreciated as the same becomes better understood by reference to the following detailed description when considered in connection with the accompanying drawings, wherein:

FIG. 9 is a fragmentary view of the face of a drum with recessed areas;

FIG. 10 is a schematic illustration of additional coating apparatus;

FIG. 11 illustrates a mask for an electron gun or other radiation source for polymerizing an acrylate film;

FIG. 12 illustrates a fragment of a moveable mask for a radiation source;

FIG. 13 illustrates another variety of evaporation nozzle; and

FIG. 14 illustrates another embodiment of interference filter constructed according to principles of this invention.

DESCRIPTION

Figure 1:
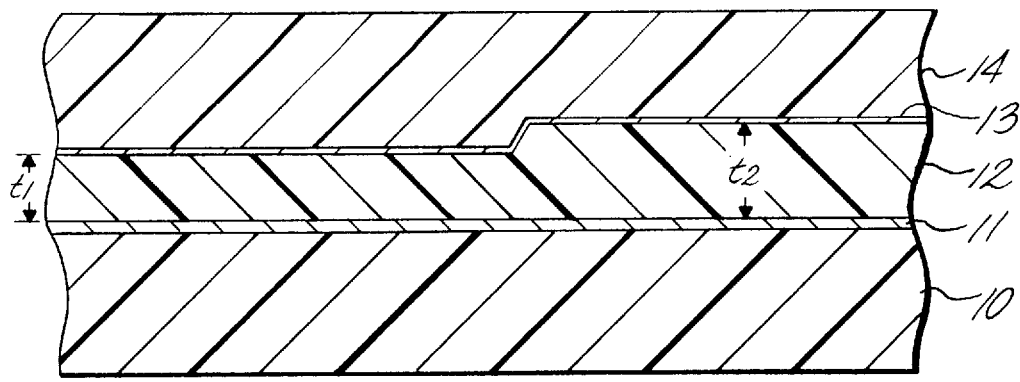
FIG. 1 is a fragmentary transverse schematic cross-section of a reflective multicolor interference filter constructed according to principles of this invention.

FIG. 1 illustrates in fragmentary transverse cross-section a thin film reflective interference filter. It will become apparent that this is a schematic illustration where the thicknesses of the various layers of the filter are exaggerated for clarity of illustration.

The reflective interference filter is deposited on a sheet substrate 10 having a smooth surface. The substrate is typically a thin sheet of material such as polyester, polypropylene or kraft paper. Thin flexible substrates are desirable for high speed coating where a roll of the substrate material can be continuously coated in a vacuum apparatus. Clearly, with a sacrifice in coating speed, thin films may be coated onto rigid substrates.

The substrate is first coated with a thin metal layer 11 which is largely opaque and reflective. At least 75% reflectivity is preferable. Any easily deposited metal may be used for the reflective layer such as aluminum, chromium, nickel, nickel-chromium alloy, stainless steel, silver, or the like. Essentially colorless metals are preferred over metals having inherent color such as copper. Typically, the opaque reflective metal layer has a thickness in the range of from 200 to 2000 Ångstroms.

A thin layer 12 of transparent dielectric material is deposited on the reflective layer. The thickness of the dielectric layer and its index of refraction determine the path length of light through the filter and hence, the color of light reflected. As can be seen at the left side of FIG. 1, a predetermined area of the dielectric layer is formed with a thickness $t_1$ which is different from the thickness $t_2$ of an adjacent area illustrated at the right in FIG. 1. Both of these thicknesses, $t_1$ and $t_2$ are in a range from about 700 to 10,000 Å and preferably in a range of from about 800 to 4000 Å. Such thicknesses are in a range for producing an interference color from the filter. The preferred dielectric material is a monolithic acrylate polymer as described hereinafter.

The next layer in the interference filter is a layer 13 of metal thin enough to be semi-transparent. Again, the metal layer may be any metal which is conveniently deposited as a thin film such as, for example, aluminum, chromium, nickel, nickel-chromium alloy, stainless steel, or silver. Chromium is a particularly preferred material since it can be deposited readily with a controlled reflectivity and is resistant to corrosion. The semi-transparent (or semi-reflective) layer is at least 25% transparent and is preferably about 50% transparent and 50% reflective. Typical thickness of the layer is about 50 to 200 Å.

The two metal layers may be deposited by any conventional deposition technique such as vacuum metalizing, or sputtering. Generally speaking, it is desirable to prepare the substrate for subsequent coatings by first depositing the reflective metal layer. Polyester film pre-coated with aluminum or other metal is commercially available and forms a suitable substrate.

After forming the interference filter with the two reflective metal layers spaced apart by a transparent dielectric, the thin films may be protected by a deposited superstrate 14. The superstrate is a material that provides abrasion resistance and may have a surface that is susceptible to receipt of inks for printing over the filter. It can be either an organic or inorganic material deposited by conventional roller coating or vapor deposition. A preferred material is an acrylic with a thickness of 2 micrometers or more.

The acrylate layer forming the dielectric material 12 of the filter is preferably deposited in the form of vaporized acrylate monomer. The monomer film is irradiated with ultraviolet or an electron beam to cause polymerization of the acrylate to form a monolithic film. Polymerization by irradiation is a conventional practice and the electron flux required or wavelength and total flux of ultraviolet used are commonly known.

Evaporation of the monomer is preferably from flash evaporation apparatus as described in U.S. Pat. Nos. 4,722,515, 4,696,719, 4,842,893, 4,954,371 and 5,097,800. These patents also describe polymerization of acrylate by radiation. In such flash evaporation apparatus, liquid acrylate monomer is injected into a heated chamber as 1 to 50 micrometer droplets. The elevated temperature of the chamber vaporizes the droplets to produce a monomer vapor. The monomer vapor fills a generally cylindrical chamber with a longitudinal slot forming a nozzle through which the monomer vapor flows. A typical chamber behind the nozzle is a cylinder about 10 centimeters diameter with a length corresponding to the width of the substrate on which the monomer is condensed. The walls of the chamber may be maintained at a temperature in the order of 200° to 320° C.

Two styles of evaporator are suitable. In one of them, the orifice for injecting droplets and flash evaporator are connected to one end of the nozzle cylinder. In the other style, the injector and flash evaporator section is attached in the center of the nozzle chamber like a T.

A group of acrylate resins employed for making the dielectric layer are monomers having a molecular weight in the range of from 150 to 600. Preferably the monomers have a molecular weight in the range of from 200 to 300. If the molecular weight is too low, the monomer is too volatile and does not condense well for forming a monomer film. Monomer that does not condense on the desired substrate may foul vacuum pumps and hinder operation of an electron gun used for polymerizing the resin. If the molecular weight is too great, the monomer does not evaporate readily in the flash evaporator at temperatures safely below the decomposition temperature of the monomer.

When the monomers polymerize, there may be shrinkage of the film. Excessive shrinkage may cause poor adhesion of the film on the substrate. As will be explained hereinafter, some shrinkage is desirable in certain embodiments of this invention. Adhesion of the film to the substrate is also dependent on thickness of the film. A thin film may tolerate greater shrinkage without loss of adhesion than a thick film. Shrinkage up to about 15 to 20% can be tolerated in the thin films used in the dielectric layer of the interference filter.

To obtain low shrinkage, there should be a relatively low crosslink density. High crosslink density monomers such as hexane diol diacrylate (HDDA) and trimethylol propane diacrylate (TMPTA) have poor adhesion to metal. A way of defining crosslink density and shrinkage is to consider the size of the molecule and the number of acrylate groups per molecule.

Preferably, the acrylate monomer has an average molecular weight to acrylate group ratio in the range of from 150 to 400. In other words, if the acrylate is a monoacrylate, the molecular weight is in the range of from 150 to 400. (Actually, it is preferred that the molecular weight of a monoacrylate be greater than 200 for other reasons.) On the other hand, if a diacrylate is used, the molecular weight may be in the range of from 300 to 800. As described hereinafter, blends of acrylates of differing functionality and molecular weights may also be used. In that case, the average molecular weight to acrylate group ratio should be in the range of from 150 to 400. This range of values provides sufficiently low shrinkage of the acrylate layer upon curing that good adhesion is obtained. If the molecular weight to acrylate group ratio is too high, there may be excessive shrinkage and poor adhesion to a metal layer.

Some examples of the ratio are as follows:

| | |
|---|---|
| trimethylol propane diacrylate | 98 |
| hexane diol diacrylate | 113 |
| beta carboxy ethyl acrylate | 144 |
| tripropylene glycol diacrylate | 150 |
| polyethylene glycol diacrylate | 151 |
| tripropylene glycol methyl ether monoacrylate | 260 |

A 50/50 blend of tripropylene glycol diacrylate and tripropylene glycol methyl ether monoacrylate has an average ratio of 205. Higher molecular weight materials may be blended with beta carboxy ethyl acrylate (BCEA) to provide a suitable average molecular weight material.

Suitable acrylates not only have a molecular weight in the appropriate range, they also have a "chemistry" that does not hinder adhesion. Generally, more polar acrylates have better adhesion than less polar monomers. Long hydrocarbon chains may hinder adhesion. For example, lauryl acrylate has a long chain that is hypothesized to be aligned away from the substrate and hinder polymerization, leading to relatively poor adhesion on most substrates.

A typical monomer used for flash evaporation includes an appreciable amount of diacrylate and/or triacrylate to promote polymerization. Blends of acrylates may be employed for obtaining desired evaporation and condensation characteristics and adhesion, and for controlled shrinkage of the deposited film during polymerization.

Suitable monomers are those that can be flash evaporated in a vacuum chamber at a temperature below the thermal decomposition temperature of the monomer and below a temperature at which polymerization occurs in less than a few seconds at the evaporation temperature. The mean time of monomer in the flash evaporation apparatus is typically less than one second. Thermal decomposition, or polymerization are to be avoided to minimize fouling of the evaporation apparatus. The monomers selected should also be readily capable of cross-linking when exposed to ultraviolet or electron beam radiation.

The monomer composition may comprise a mixture of monoacrylates and diacrylates. Triacrylates tend to be reactive and may polymerize at the evaporation temperatures, but may be useful in blends. Depending on the techniques used for making a multicolored interference filter, a high or low shrinkage film may be desirable. Generally speaking, the shrinkage is reduced with higher molecular weight materials. Blends of monomers with different shrinkage characteristics may be employed for obtaining a desired shrinkage. Generally, for good adhesion to a metal film a low shrinkage is desirable.

Preferably, the molecular weight of the acrylate monomer is in the range of from 200 to 300. If the molecular weight is less than about 200, the monomer evaporates readily, but may not condense quantitatively on the substrate without chilling of the substrate. If the molecular weight is more than about 300, the monomers become increasingly difficult to evaporate and higher evaporation temperatures are required.

There are about five monoacrylates, ten diacrylates, ten to fifteen triacrylates and two or three tetraacrylates which may be included in the composition. A particularly good acrylate is a 50:50 blend of TRPGDA and tripropylene glycol methyl ether monoacrylate with a molecular weight of about 260 (available as Henkel 8061).

Exemplary acrylates which may be used, sometimes in combination, include monoacrylates 2-phenoxy ethyl acrylate (M.W. 192), isobornyl acrylate (M.W. 208) and lauryl acrylate (M.W. 240), diacrylates diethylene glycol diacrylate (M.W. 214), neopentyl glycol diacrylate (M.W. 212) and polyethylene glycol diacrylate (PEGDA) (M.W. 151) or tetraethylene glycol diacrylate (M.W. 302), triacrylates trimethylol propane triacrylate (M.W. 296) and pentaerythritol triacrylate (M.W. 298), monomethacrylates isobornyl methacrylate (M.W. 222) and 2-phenoxyethyl acrylate (M.W. 206) and dimethacrylates triethylene glycol dimethacrylate (M.W. 286) and 1,6-hexanediol dimethacrylate (M.W. 254).

As has been mentioned, the nozzle for the flash evaporator typically comprises a slot extending longitudinally along the evaporator chamber. In an exemplary evaporator, the nozzle slot may have a width in the range of from 0.75 to 1 mm. The surface of a substrate on which the monomer is condensed may be moved past the nozzle at a distance from the nozzle of about 2 to 4 mm. Typical speed of traverse of the substrate past the nozzle is in the order of 150 to 300 meters per minute.

Figure 2:
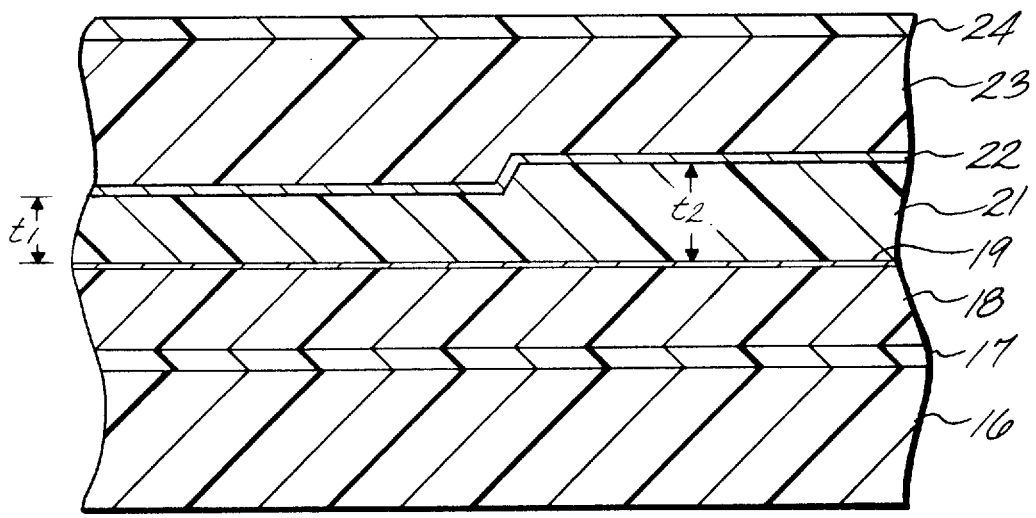
FIG. 2 is a transverse cross-section of a multicolor interference filter with adhesive for transfer to another substrate.

FIG. 2 is a fragmentary cross-section of another embodiment of interference filter constructed according to this invention. In this embodiment there is a temporary substrate 16, such as a polyester film on which there is a thin release layer 17, such as a wax or silicone. A superstrate material 18 is deposited on the temporary substrate over the release layer by a technique such as flash evaporation of an acrylate monomer. The acrylate monomer is polymerized by irradiation.

A semi-reflective metal layer 19 is then deposited on the superstrate. Thereafter, a transparent dielectric layer 21 of polymerized acrylate is formed as described above. Preferably a predetermined area of the dielectric layer has a first thickness $t_1$ while an adjacent area has a different thickness $t_2$. An opaque reflective metal layer 22 is deposited over the dielectric. The reflective metal layer 22, dielectric layer 21 and semi-reflective metal layer 19 form an interference filter. A permanent substrate material 23 is deposited on the opaque metal layer. Finally a layer 24 of pressure-sensitive adhesive is placed over the permanent substrate.

This embodiment of interference filter is useful for transfer to a substrate that is not conveniently handled in a vacuum system or for application to small areas of a larger substrate, such as, for example, marking limited areas on currency. When this interference filter is used, the pressure-sensitive adhesive is applied to the desired substrate and the temporary substrate 16 is peeled off. This leaves the superstrate 18 exposed and the interference filter is then essentially like that described and illustrated in FIG. 1.

A part of the layers just described may be used without the pressure-sensitive adhesive to form a pigment. In such an embodiment a thin protective layer of acrylate similar to the superstrate material is deposited over a release layer and polymerized. A metal layer is then deposited on the protective layer and a transparent layer of polymerized acrylate is formed as described above. A second metal layer is deposited over the acrylate and a final protective layer of acrylate is added over the metal. At least one of the metal layers is semi-reflective and both may be semi-reflective. The sandwich of acrylate, metal, acrylate, metal and acrylate forms a protected interference filter. This sandwich can be removed from the release layer and broken up to form colored pigment flakes.

Figure 3:
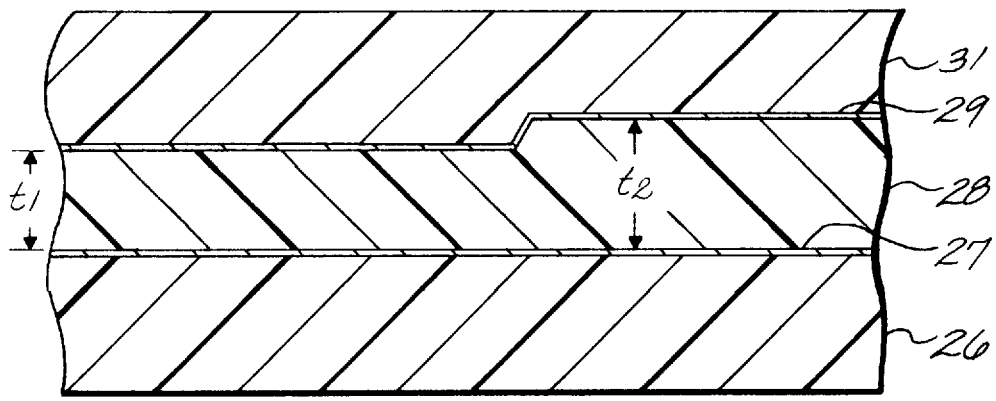
FIG. 3 is a transverse cross-section of a transmission multicolor interference filter.

FIG. 3 illustrates another embodiment of interference filter which may be viewed from either face. A substrate 26, such as a polyester film is coated with a thin enough layer 27 of metal that the layer is semi-reflective. A dielectric layer 28 having one thickness $t_1$ in a predetermined area and a different thickness $t_2$ in adjacent areas is formed on the semi-reflective metal. A second semi-reflective metal layer 29 is deposited over the dielectric layer and is protected by an overlying superstrate 31 of polymerized acrylate. The two semi-reflective layers 27 and 29, preferably each reflect about 50% and transmit about 50% of the light incident thereon. The semi-reflective layers and the intervening dielectric layer form an interference filter which provides a multi-color appearance from either face of the sheet.

Figure 4:
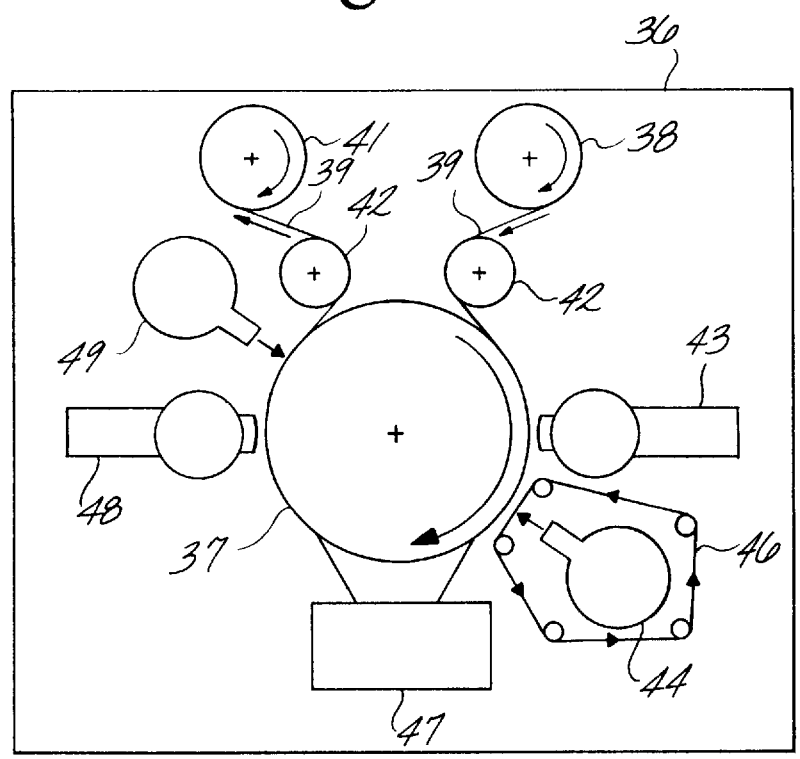
FIG. 4 is a schematic illustration of coating apparatus for forming a multicolor interference filter.

A flexible substrate material is preferable for any of these embodiments of multicolor interference filter since a sheet of such material can be rapidly coated with the multiple layers described above. A suitable apparatus for coating the substrate is illustrated schematically in FIG. 4. All of the coating equipment is positioned in a conventional vacuum chamber 36. A roll of polyester sheet coated on one face with a reflective layer of aluminum is mounted on a pay-out reel 38. The sheet 39 is wrapped around a rotatable drum 37 and fed to a take-up reel 41. Idler rolls 42 are employed, as appropriate, for guiding the sheet material from the pay-out reel to the drum and to the take-up reel.

A flash evaporator 43 as hereinabove described is mounted in proximity to the drum at a first coating station. The flash evaporator deposits a layer or film of acrylate monomer on the substrate sheet as it travels around the drum. After being coated with acrylate monomer the substrate sheet passes an irradiation station where the acrylate is irradiated by a source 44 such as an electron gun or source of ultraviolet radiation. A movable mask 46 may be positioned on rollers for movement through the gap between the radiation source and the drum in synchronism with rotation of the drum. The radiation induces polymerization of the acrylate monomer.

The sheet then passes a metalization station 47 where a semi-reflective coating of metal is applied by vacuum metalizing or sputtering. This completes the interference filter. The sheet then passes another flash evaporator 48 where another layer of acrylate monomer is deposited for forming a superstrate. This layer of monomer is cured by irradiation from an ultraviolet or electron beam source 49 adjacent the drum.

There are a variety of techniques for producing different thicknesses of dielectric layer in different areas of the interference filter. Broadly there are two categories of techniques. One is to condense different amounts of monomer in different areas of the dielectric layer to produce different thicknesses directly. Several techniques are suitable for this. Alternatively, one may deposit a uniform thickness of monomer in all areas and then shrink the film thickness to different extents in different areas. As has been mentioned above, the acrylate monomer shrinks upon polymerization. By controlling the degree of polymerization of the film, the thickness of the dielectric layer may be controlled. Again there are different techniques for accomplishing this.

Figure 5:
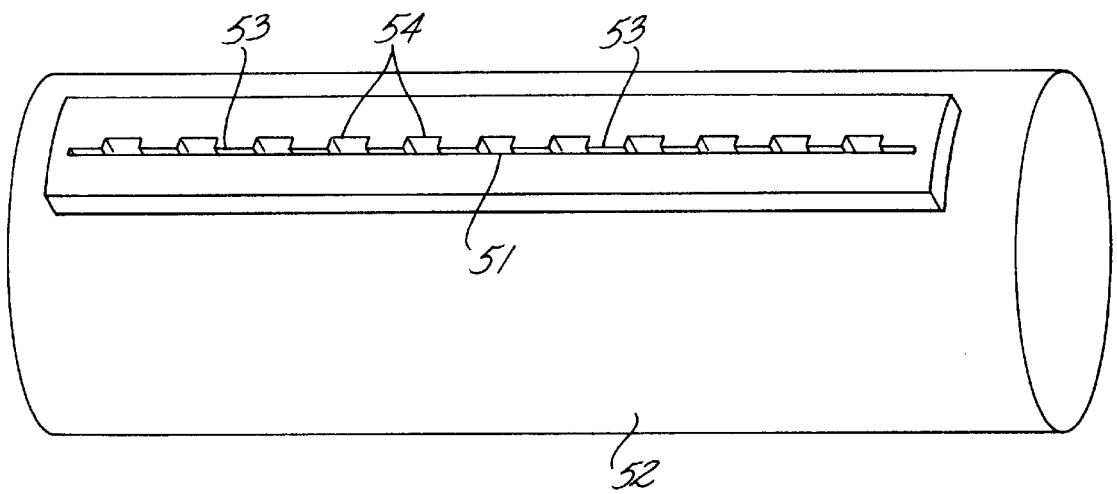
FIG. 5 is a schematic illustration of an evaporation nozzle.

FIG. 5 illustrates schematically an arrangement for depositing different thicknesses of acrylate monomer on different portions of a substrate. In this embodiment there is an elongated slot 51 forming a nozzle along the length of a flash evaporator chamber 52. Instead of having a uniform width along the length of the nozzle, there are alternating narrow regions 53 and regions of wide slot 54. As will be apparent, more acrylate is evaporated through the wide portions 54 of the nozzle than through the narrower portions. As a consequence, as the substrate moves past the nozzle (perpendicular to the length of the nozzle) alternating thick and thin stripes of acrylate monomers are deposited. Because of the differences in thickness in the resulting dielectric layer, alternating stripes of color such as pale green and pink are obtained.

Such a nozzle with alternating wide and narrow areas may be held stationary as the sheet moves to produce parallel stripes. Alternatively, such a nozzle may be moved longitudinally as the sheet moves past it and produce a zigzag pattern of colors from the interference filter.

A somewhat analogous technique may be used for obtaining differing thicknesses in different areas of the interference filter by differential polymerization of a uniform thickness of monomer. The similarity can be seen by reference to FIG. 11 which illustrates a source of radiation 56 such as an ultraviolet lamp or an electron beam gun. A mask 57 is interposed between the radiation source and the substrate with the monomer film to be polymerized (not shown in FIG. 11). A slot 58 with alternating wide and narrow areas in the mask permits passage of greater or lesser amounts of radiation. Where the greater total flux of radiation impinges on the monomer, there is a greater degree of polymerization than in adjacent areas where the total flux of radiation is less. Because of the inherent shrinkage of the monomer upon polymerization, the areas with greater total energy of irradiation are thinner than the areas with less total radiation (and polymerization). Parallel stripes of different colors are thereby obtained from the interference filter.

It should be apparent that by combining a nozzle with different widths of slot and a radiation source with different widths of mask in appropriate alignments, three or four different colors of stripes can be obtained from an interference filter. Furthermore, the slots in masks for deposition or polymerization may have three or more widths instead of just two for additional color variation.

Simply having colored stripes from a multicolor interference filter may not be considered sufficient for some purposes. The movable belt mask 46, illustrated in FIG. 5 and again in FIG. 12, may be used for producing any of a broad variety of multicolor patterns. In the schematic illustration of FIG. 12 such a movable mask has apertures 61 in the form of stars and windows 62 in the form of rectangles. Just as an example, the star shaped apertures may be semi-transparent areas in an otherwise opaque belt. The rectangular windows may be completely transparent.

Such a mask is moved in synchronism with rotation of the drum and the coating apparatus. An ultraviolet light 41 behind the mask provides full irradiation through the rectangular areas and partial radiation through the starshaped areas. When such a mask is used it is desirable to employ an additional source of radiation (not shown) in series with the ultraviolet lamp so that all of the monomer receives at least a minimum level of radiation.

It will be apparent that in such an embodiment the dielectric layer will have three different thicknesses. Most of the area irradiated by another source of radiation has a limited degree of polymerization and hence is relatively thicker. The full irradiation through the open windows 62 produces rectangular areas on the dielectric filter which are completely polymerized and hence shrink to the minimum thickness. The intermediate level of irradiation through the star shaped openings 61, produces intermediate polymerization and intermediate thickness. The resulting interference filter has three different colors.

A similar type of mask, having completely open windows in an otherwise impermeable belt, may be moved between a flash evaporator and the rotating drum. The areas opposite the star and rectangular shaped openings are coated with a layer of monomer. Another flash evaporator either upstream or downstream from the one occulted by the movable mask, deposits a uniform layer of monomer on the substrate. The resulting different thicknesses of deposited monomer are then polymerized for producing a monolithic acrylate film having different thicknesses in different areas, hence with a two dimensional multicolor pattern.

Figure 6:
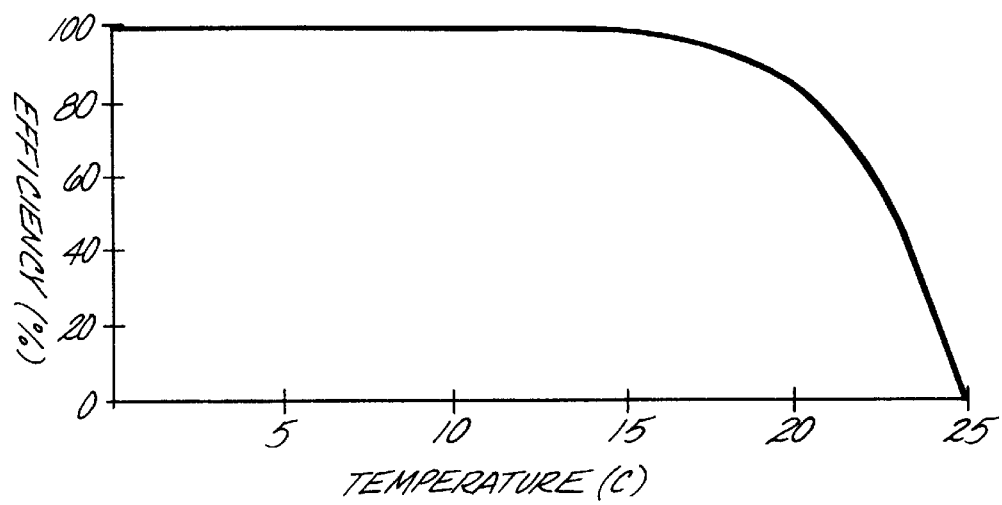
FIG. 6 is a graph illustrating condensation efficiency as a function of temperature.

Another way of varying the thickness of acrylate monomer on the substrate is by controlling the efficiency of condensation. The efficiency of condensation of the monomer is highly dependent on the temperature of the substrate on which the monomer impinges. The effect of temperature depends on the particular monomer. An exemplary indication of the efficiency as a function of temperature is illustrated in the graph of FIG. 6. At low temperatures such as close to 0° C., there is essentially 100% efficiency and all of the monomer condenses. At a somewhat higher temperature, such as for example, 25° C., little, if any, of the monomer actually condenses on the substrate. It can be seen that in some temperature ranges the efficiency of condensation is quite sensitive to relatively small changes in temperature.

This temperature effect on efficiency of condensation is exploited for producing films with monomer having different thicknesses in different areas of the interference filter. A low temperature substrate with high efficiency of condensation produces a relatively thicker dielectric layer whereas a somewhat higher temperature area with less efficient condensation produces a relatively thinner dielectric layer. A number of techniques may be used for varying the temperature of the substrate.

One way is to employ a movable mask, such as illustrated in FIG. 12 immediately upstream from the flash evaporator which applies the acrylate monomer which becomes the dielectric film. An infrared lamp behind the mask irradiates areas on the substrate which absorb the infrared radiation and are thereby heated. The higher temperature areas have less efficient condensation and hence a thinner layer of monomer than adjacent cooler areas.

Because the efficiency of condensation changes rather steeply in the general vicinity of ambient temperatures and since the flash evaporation and irradiation tend to raise the temperature of the substrate, it is desirable to refrigerate the roll of substrate until it is placed on the pay-out reel in the coating apparatus. It is also desirable to cool the rotating drum, such as for example, with chilled water, so that the substrate remains at a low temperature.

Figure 7:
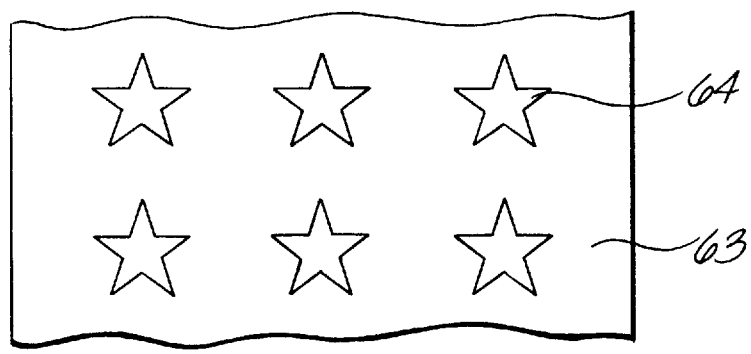
FIG. 7 is a fragmentary view of the face of a drum with varying thermal properties.

FIG. 7 illustrates a fragment of the surface of a cooled drum 63 which supports a thin sheet substrate (not shown) as it moves through a coating apparatus. A number of ordinary paper stars 64 are glued onto the surface of the drum. The substrate wrapped around the drum during coating is in good thermal contact with the drum between the stars. Where the paper stars intervene between the surface of the drum and the substrate, the temperature of the substrate is higher since the substrate is insulated from the cooling drum. As a consequence of this thermal insulation and differential thermal pattern, there is a relatively thinner layer of monomer adjacent the stars and a relatively thicker layer elsewhere on the substrate. This results in a multicolor interference filter.

Figure 8:
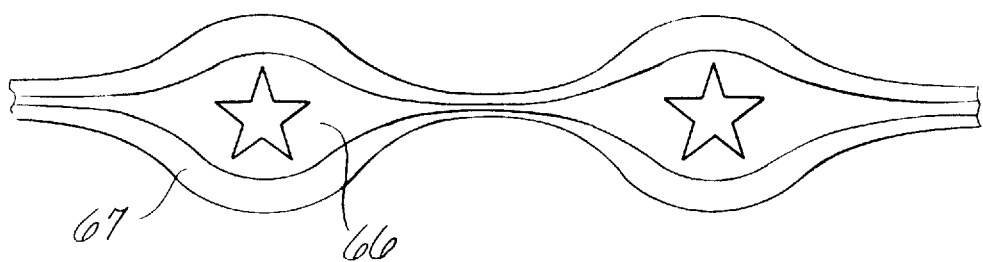
FIG. 8 illustrates a color pattern obtained from a drum as illustrated in FIG. 7.

FIG. 8 illustrates the effect achieved in an actual experiment where paper stars were glued on the surface of a water-cooled drum. In the area of the star the interference filter produces a gold color with flecks of red or magenta. The color, of course, depends on the angle from which the interference pattern is observed. The colors mentioned are for observation at approximately normal incidence. When viewed at about 45° the color of the star is seen as a blue-green color. Surrounding the star is a halo 66 which is a blue or blue-green color. Surrounding the halo is a band 67 of generally gold color with a reddish hue along the center of the band. The balance of the area of the interference filter which was in better thermal contact with the drum is blue or purple in color. It is hypothesized that the band with a color resembling that of the star may be due to a half wavelength change in thickness of the dielectric layer.

FIG. 9 illustrates another way of controlling the temperature of sheet substrate. FIG. 9 illustrates a fragment of the surface 68 of a water-cooled drum. The surface is covered with a pattern of shallow recesses 69. When the thin sheet is wrapped around the drum, it is in good thermal contact with the surface 68, but is spaced apart from the drum surface opposite the recesses. The vacuum in the coating apparatus is an excellent insulator, and the areas over the recesses are essentially uncooled, whereas the areas in contact with the surface of the drum are cooled. The resulting differential temperature pattern results in differing efficiency of condensation of monomer on the substrate, hence differing thicknesses of dielectric layer in the interference filter.

A very simple pattern of diagonal squares is illustrated for the recesses, but it will be apparent that any desired recess pattern may be generated on the surface of the drum.

Such a drum is also useful in an embodiment where there is differential polymerization, hence differential shrinkage in a monomer. When the monomer is polymerized by an electron beam, the areas of the substrate in contact with the surface 68 of the drum are well grounded. The areas opposite the recesses 69 are not as well grounded and develop an electrostatic charge which tends to repel the electron beam. The resulting differences in total irradiation of the electron beam on the monomer result in differences in polymerization in the dielectric layer. The resulting shrinkage differences produce multicolored images.

Electrical grounding may also be used in a different way in an electron gun, particularly for forming stripes of color along a moving sheet. The electron beam in a gun is accelerated by a potential difference between the electron source and an accelerating screen. By varying the effectiveness of the grounding of the screen, the electron beam can have different total flux in different areas and hence produce differential polymerization.

It will also be apparent that an electron gun may have a narrow steerable beam which can be used to "write" on the monomer film for producing any desired image in multiple colors. A particularly desirable way of doing this is with an electron gun that scans across the moving substrate perpendicular to the direction of travel of the substrate. The intensity of the electron beam is modulated as a function of time during the scan for producing variable polymerization and, in effect, scans across the film. Such a technique is quite analogous to producing a television image with a raster scan and quite intricate multicolor patterns can be produced in an interference filter.

FIG. 10 illustrates another technique for preparing thermal imprints on a thin sheet substrate 71 before flash evaporation of an acrylate monomer. In this coating apparatus, a refrigerated roll of substrate is placed on a pay-out reel 72 in a vacuum system 73. The substrate passes through the apparatus past a number of coating and curing stations and is wound onto a take-up reel 74.

The substrate 71 first passes a metalization station 76 where one of the metal layers for forming the interference filter is deposited by vacuum metalizing or sputtering. The thin film then passes through a thermal imprinting station where the surface to receive the acrylate monomer is passed between a backing roll 77 and a thermal imprinting roll 78. An exemplary thermal imprinting roll has raised areas of relatively low conductivity rubber which engaged the surface of the substrate. The rubber raised areas are contacted by a heated roll 79. The heated roll elevates the temperature of the raised areas on the imprinting roll and the resulting thermal pattern is "printed" onto the substrate. Alternatively, the imprinting roller 78 may itself be heated or cooled for imposing a differential temperature pattern on the substrate.

The substrate, which retains the thermal pattern temporarily in the vacuum, next passes a flash evaporation station 80 where an acrylate monomer is condensed on the substrate. As pointed out above, the differential temperature results in different thicknesses of monomer being deposited on the substrate. The substrate then passes a radiation source 81 where ultraviolet or an electron beam polymerizes the monomer. The film then passes the final metalization station 82 where the second metal layer is deposited. Additional stations may be included if desired for adding a protective superstrate, etc.

EXAMPLES

A multicolor interference filter can be made by evaporating acrylate monomer through a longitudinal slot 84 as illustrated in FIG. 13 with intermittent areas 85 where the slot is essentially blocked. Such a nozzle produces a coating having two colors. For example, in one experiment, the coating opposite an open area 84 of the slot was gold, with a bright blue line about 7 mm wide opposite the blocked area 85. The dielectric layer opposite the blocked slot was considerably thinner than the gold area adjacent to the blue stripe.

In another experiment, the temperature of the coating drum was changed rapidly during deposition. The drum temperature was lowered rapidly from about 20° C. to about 0° C. The polyester film that was in contact with the drum experienced a temperature change which was a reflection of the changing temperature of the drum. As the drum cooled, the color from the resultant interference filter changed from purple, to blue, to yellow.

The color patterns developed by pasting paper stars on a water cooled drum have been illustrated in FIG. 8. In this experiment, the paper stars were either 75 or 150 micrometers thick and about 9.5 mm wide.

The variation in thickness due to differential shrinkage upon polymerization of the acrylate was demonstrated by varying the electron flux from an electron gun. This was done by varying the grounding condition of the accelerating screen through which the electrons pass. A greater electron flux is emitted through areas where the screen is well grounded. Thus, there is a curtain of electrons with alternating lanes of heavy and light flux.

Due to the alternating high and low flux zones, the degree of polymerization of the acrylate differed. In these examples, the polyester film substrate was 50 cm. wide. In one experiment three pink stripes were interleaved with three light green stripes. Similarly, alternating blue and gold stripes were produced with a different thickness of dielectric layer. By tripling the number of grounding points on the electron gun screen the number of stripes with varying electron density was tripled and twice as many narrower color stripes produced.

FIG. 14 illustrates another embodiment of interference filter constructed according to principles of this invention. In this embodiment color is obtained by having multiple transparent layers which are alternately materials with high index of refraction and low index of refraction, respectively. Interference effects due to changes in index of refraction between the layers provide color for either a reflective or transparent object.

Such an object comprises a substrate 90 which may be transparent or opaque as required for a particular application. The substrate on which the multiple layers of acrylate are deposited may be either a rigid object or a flexible sheet substrate. If desired, a metal layer (not shown) may be applied over the substrate for greater reflectance. A plurality of alternating layers of low refractive index material 91 and high refractive index material 92 are deposited on the substrate. As pointed out above, the thicknesses of the high and low refractive index materials may be varied in different areas of the object to provide different colors, and in any case are appreciably less than one micron.

The acrylate employed for depositing the several layers are selected for their compatibility and index of refraction. Generally speaking, the fluorinated acrylates tend to have a low refractive index and are suitable for the low index layers. An exemplary high index material comprises a bisphenol A diacrylate. It is preferred that the acrylate monomer have a molecular weight to acrylate group ratio in the range of from 150 to 400. As few as two layers may be sufficient where a hint of color is sufficient. Generally, however, several layers of alternating high and low index of refraction are employed.

Although a substantial number of methods for forming a multicolor interference filter, have been described and illustrated herein, it will be apparent to those skilled in the art that additional embodiments can readily be devised. Other techniques may be used for depositing nonuniform layers of acrylate dielectric for producing desired color patterns. Similarly, other techniques may be used for controlling shrinkage of a condensed film of monomer by controlling the degree of polymerization. It is therefore to be understood that within the scope of the appended claims, this invention may be practiced otherwise than as specifically described.

What is claimed is:

1. An interference color filter comprising:

a first at least partially reflective and partially transparent layer;

an evaporated, condensed and crosslinked transparent acrylate layer on the at least partially reflective layer having a molecular weight to acrylate group ratio in the range of from 150 to 400, the acrylate layer having a thickness sufficient for producing an interference color; and a second at least partially reflective layer on the opposite face of the acrylate layer from the first reflective layer; and wherein the filter is broken up to form colored pigment flakes.

2. An interference color filter as recited in claim 1 wherein one of the reflective layers comprises a substantially completely reflective metal.

3. An interference color filter as recited in claim 1 further comprising a protective layer of crosslinked acrylate covering at least one of the reflective layers.

4. An interference color filter as recited in claim 1 wherein both reflective layers are semi-reflective.

5. An interference color filter comprising:

a first evaporated, condensed and crosslinked transparent acrylate layer having a molecular weight per acrylate group in the range of from 150 to 400, the acrylate layer having a thickness sufficient for producing an interference color;

an at least partially reflective layer on one face of the acrylate layer; and a second evaporated, condensed and crosslinked transparent acrylate layer having a molecular weight per acrylate group in the range of from 150 to 400, the acrylate layer having a thickness sufficient for producing an interference color; and wherein the filter is broken up to form colored pigment flakes.

6. A reflective flake pigment comprising:

a first crosslinked transparent acrylate layer having a molecular weight per acrylate group in the range of from 150 to 400;

a reflective metal layer on one face of the acrylate layer; and a second crosslinked transparent acrylate layer having a molecular weight per acrylate group in the range of from 150 to 400.

7. An interference color filter comprising:

a first crosslinked transparent acrylate layer having a molecular weight per acrylate group in the range of from 150 to 400;

a first at least partially reflective layer on one face of the acrylate layer;

a second crosslinked transparent acrylate layer having a molecular weight per acrylate group in the range of from 150 to 400, the acrylate layer having a thickness sufficient for producing an interference color;

a second at least partially reflective layer over the second acrylate layer; and a third crosslinked transparent acrylate layer having a molecular weight per acrylate group in the range of from 150 to 400 over the second reflective layer; and wherein the filter is broken up to form colored pigment flakes.

8. An interference color filter comprising:

a first at least partially reflective and partially transparent layer;

an evaporated condensed and crosslinked transparent acrylate layer on the at least partially reflective layer having a molecular weight to acrylate group ratio in the range of from 150 to 400, the acrylate layer having a thickness in the range of from 800 to 4000 Ångstroms for producing an interference color; and a second at least partially reflective layer on the opposite face of the acrylate layer from the first reflective layer.

9. A multiple color interference filter comprising:

a substrate; and a monolithic acrylate polymer film deposited on the substrate with a sufficient thickness for producing interference color, a predetermined area of the acrylate film having a first thickness and a second area of the acrylate film adjacent to the predetermined area having a second thickness different from the thickness of the predetermined area.

10. A multiple color interference filter comprising:

a substrate; and a monolithic acrylate polymer film deposited on the substrate with a sufficient thickness for producing interference color, a predetermined area of the acrylate film having a first degree of polymerization and a second area of the acrylate film adjacent to the predetermined area having a second degree of polymerization different from the polymerization of the predetermined area.

* * * * *